US011971631B2

(12) United States Patent
    Xi

(10) Patent No.: US 11,971,631 B2
(45) Date of Patent: Apr. 30, 2024

(54) LIQUID CRYSTAL DISPLAY PANEL AND DISPLAY DEVICE

(71) Applicant: Shenzhen China Star Optoelectronics Semiconductor Display Technology Co., Ltd., Guangdong (CN)

(72) Inventor: Suping Xi, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 677 days.

(21) Appl. No.: 17/040,591

(22) PCT Filed: May 20, 2020

(86) PCT No.: PCT/CN2020/091203
    § 371 (c)(1),
    (2) Date: Sep. 23, 2020

(87) PCT Pub. No.: WO2021/227100
    PCT Pub. Date: Nov. 18, 2021

(65) Prior Publication Data
    US 2023/0094410 A1    Mar. 30, 2023

(30) Foreign Application Priority Data
    May 11, 2020 (CN) .......................... 202010392258.6

(51) Int. Cl.
    *G02F 1/1368*    (2006.01)
    *B23K 26/55*    (2014.01)
    (Continued)

(52) U.S. Cl.
    CPC ........ *G02F 1/134309* (2013.01); *B23K 26/55* (2015.10); *G02F 1/13454* (2013.01);
    (Continued)

(58) Field of Classification Search
    CPC ...................................................... G02F 1/1362
    See application file for complete search history.

(56) References Cited

U.S. PATENT DOCUMENTS 8,471,989 B2    6/2013  Park
2009/0257009 A1*  10/2009  Hirato ............... G02F 1/134336
                                    349/110
(Continued)

FOREIGN PATENT DOCUMENTS

CN    102033369    4/2011
CN    202141824    2/2012
(Continued)

*Primary Examiner* — Sang V Nguyen

(57) ABSTRACT

The present disclosure provides a liquid crystal display panel and a display device. The liquid crystal display panel includes an array substrate. A hollow structure is defined in a common electrode layer. The hollow structure includes a first hollow structure corresponding to a display area. An area of the first hollow structure progressively increases along a direction from an array routing area to the display area, so that an area of the common electrode layer corresponding to the display area progressively decreases along the direction from the array routing area to the display area, thereby making RC loadings uniform and keeping charging rates in various areas same.

20 Claims, 3 Drawing Sheets

(51) Int. Cl.
*G02F 1/1343* (2006.01)
*G02F 1/1345* (2006.01)
*G02F 1/1362* (2006.01)
*B23K 101/36* (2006.01)

(52) U.S. Cl.
CPC ...... *G02F 1/136286* (2013.01); *G02F 1/1368* (2013.01); *B23K 2101/36* (2018.08)

(56) References Cited

U.S. PATENT DOCUMENTS

| | | | | |
|---|---|---|---|---|
| 2009/0322975 | A1* | 12/2009 | Song | G02F 1/133707 349/46 |
| 2011/0075085 | A1* | 3/2011 | Park | G02F 1/1343 349/141 |
| 2013/0215348 | A1 | 8/2013 | Chen | |
| 2013/0293809 | A1* | 11/2013 | Kuroda | G02F 1/136286 257/773 |
| 2017/0038647 | A1* | 2/2017 | Wang | G02F 1/134327 |
| 2017/0133402 | A1* | 5/2017 | Ning | H01L 27/124 |
| 2017/0160597 | A1* | 6/2017 | Ye | G02F 1/13439 |
| 2020/0033681 | A1* | 1/2020 | Morishima | G02F 1/1368 |

FOREIGN PATENT DOCUMENTS

| | | | | |
|---|---|---|---|---|
| CN | 102591080 | | 7/2012 | |
| CN | 202837757 | | 3/2013 | |
| CN | 103472606 | * | 12/2013 | ............. G02F 1/133 |
| CN | 103969897 | | 8/2014 | |
| CN | 104267546 | | 1/2015 | |
| CN | 108153066 | | 6/2018 | |
| CN | 109584833 | | 4/2019 | |
| CN | 109584833 | * | 6/2021 | ........... G02F 1/1362 |

\* cited by examiner

LIQUID CRYSTAL DISPLAY PANEL AND DISPLAY DEVICE

RELATED APPLICATIONS

This application is a National Phase of PCT Patent Application No. PCT/CN2020/091203 having International filing date of May 20, 2020, which claims the benefit of priority of Chinese Patent Application No. 202010392258.6 filed on May 11, 2020. The contents of the above applications are all incorporated by reference as if fully set forth herein in their entirety.

FIELD AND BACKGROUND OF THE INVENTION

The present disclosure relates to the field of display technologies, and particularly relates to a liquid crystal display panel and a display device.

Gate driver on array (GOA) refers to a scan drive circuit manufactured on an array substrate by a conventional array (array substrate) manufacturing process of thin film transistor liquid crystal displays to realize line-by-line scanning of scan lines.

As display panels are being developed towards large sizes, specifications of the display panels are increasingly higher, RC loadings will become larger, and signal delay will become more and more serious, thereby affecting display of the panels. Thus, effective reduction of the RC loadings is particularly necessary. For liquid crystal display panels, because a common electrode layer on a color filter layer is an indium tin oxide (ITO) layer which is laid on a whole surface of the color filter layer, an array substrate includes a display area and an array routing area disposed at a side of the display area, and a plurality of signal lines are disposed in the display area, capacitance is hence generated between the common electrode layer and the signal lines on the array substrate, thereby resulting in RC loadings. For display panels with large sizes, because the RC loadings at a side of the display area adjacent to the array routing area are smaller, while the RC loadings at a side of the display area away from the array routing area is larger, ununiform RC loadings in different areas of the display area cause different charging rates in the different areas, thereby affecting display quality.

Therefore, it is necessary to propose a new liquid crystal display panel and a display device to solve the above technical problems.

A liquid crystal display panel and a display device provided in the present disclosure solve a technical problem that display quality of liquid crystal display panels in prior art is affected, since ununiform RC loadings in different areas of a display area cause different charging rates in the different areas.

SUMMARY OF THE INVENTION

In order to solve the above problems, the present disclosure provides technical solutions as followings:

An embodiment of the present disclosure provides a liquid crystal display panel including an array substrate, a color filter substrate disposed opposite to the array substrate, and a liquid crystal layer sandwiched between the array substrate and the color filter substrate;

the array substrate includes a display area and a non-display area surrounding the display area, the non-display area includes an array routing area disposed at a side of the display area, the color filter substrate includes a common electrode layer, a hollow structure is defined in the common electrode layer, the hollow structure is manufactured by lasering, the hollow structure includes a first hollow structure corresponding to the display area, an area of the first hollow structure progressively increases along a first direction, so that an area of the common electrode layer corresponding to the display area progressively decreases along the first direction, and wherein, the first direction refers to a direction from the array routing area to the display area.

According to the liquid crystal display panel provided in an embodiment of the present disclosure, the display area includes a plurality of columns of data lines arranged in parallel along the first direction and a plurality of rows of scan lines arranged in parallel along a second direction, the data lines cross the scan lines, and thin film transistors are disposed at cross positions of the data lines and the scan lines, the first hollow structure is disposed opposite to at least part of the data lines, the scan lines, and the thin film transistors; and wherein the second direction is perpendicular to the first direction.

According to the liquid crystal display panel provided in an embodiment of the present disclosure, the first hollow structure is disposed opposite to at least one of the data lines, and the area of the first hollow structure in the second direction progressively increases along the first direction.

According to the liquid crystal display panel provided in an embodiment of the present disclosure, a width of the first hollow structure is greater than a width of each of the data lines.

According to the liquid crystal display panel provided in an embodiment of the present disclosure, the first hollow structure is disposed opposite to at least one of the scan lines, and the area of the first hollow structure in the second direction progressively increases along the first direction.

According to the liquid crystal display panel provided in an embodiment of the present disclosure, the first hollow structure is disposed opposite to at least one of the data lines and at least one of the scan lines, and the area of the first hollow structure in the second direction progressively increases along the first direction.

According to the liquid crystal display panel provided in an embodiment of the present disclosure, an orthographic projection of the first hollow structure on the array substrate covers orthographic projections of at least a part of the thin film transistors on the array substrate.

According to the liquid crystal display panel provided in an embodiment of the present disclosure, the display area includes a first area, a second area, and a third area, the first area is disposed adjacent to the array routing area, the second area is disposed away from the array routing area, and the third area is disposed between the first area and the second area, wherein, the first hollow structure is defined in the common electrode layer corresponding to the second area and a part of the third area, and the first hollow structure is not defined in the common electrode layer corresponding to the first area.

According to the liquid crystal display panel provided in an embodiment of the present disclosure, the non-display area includes gate on array (GOA) areas disposed at opposite sides of the display area, the GOA areas are disposed at an adjacent side of the array routing area, and the hollow structure includes a second hollow structure corresponding to the GOA areas.

According to the liquid crystal display panel provided in an embodiment of the present disclosure, the hollow structure further includes a third hollow structure corresponding to the array routing area.

An embodiment of the present disclosure provides a liquid crystal display panel including an array substrate, a color filter substrate disposed opposite to the array substrate, and a liquid crystal layer sandwiched between the array substrate and the color filter substrate;

the array substrate includes a display area and a non-display area surrounding the display area, the non-display area includes an array routing area disposed at a side of the display area, the color filter substrate includes a common electrode layer, a hollow structure is defined in the common electrode layer, the hollow structure includes a first hollow structure corresponding to the display area, an area of the first hollow structure progressively increases along a first direction, so that an area of the common electrode layer corresponding to the display area progressively decreases along the first direction, and wherein, the first direction refers to a direction from the array routing area to the display area.

According to the liquid crystal display panel provided in an embodiment of the present disclosure, the display area includes a plurality of columns of data lines arranged in parallel along the first direction and a plurality of rows of scan lines arranged in parallel along a second direction, the data lines cross the scan lines, and thin film transistors are disposed at cross positions of the data lines and the scan lines, the first hollow structure is disposed opposite to at least part of the data lines, the scan lines, and the thin film transistors; and wherein the second direction is perpendicular to the first direction.

According to the liquid crystal display panel provided in an embodiment of the present disclosure, the first hollow structure is disposed opposite to at least one of the data lines, and the area of the first hollow structure in the second direction progressively increases along the first direction.

According to the liquid crystal display panel provided in an embodiment of the present disclosure, a width of the first hollow structure is greater than a width of each of the data lines.

According to the liquid crystal display panel provided in an embodiment of the present disclosure, the first hollow structure is disposed opposite to at least one of the scan lines, and the area of the first hollow structure in the second direction progressively increases along the first direction.

According to the liquid crystal display panel provided in an embodiment of the present disclosure, an orthographic projection of the first hollow structure on the array substrate covers orthographic projections of at least a part of the thin film transistors on the array substrate.

According to the liquid crystal display panel provided in an embodiment of the present disclosure, the display area includes a first area, a second area, and a third area, the first area is disposed adjacent to the array routing area, the second area is disposed away from the array routing area, and the third area is disposed between the first area and the second area, wherein, the first hollow structure is defined in the common electrode layer corresponding to the second area and a part of the third area, and the first hollow structure is not defined in the common electrode layer corresponding to the first area.

According to the liquid crystal display panel provided in an embodiment of the present disclosure, the non-display area includes gate on array (GOA) areas disposed at opposite sides of the display area, the GOA areas are disposed at an adjacent side of the array routing area, and the hollow structure includes a second hollow structure corresponding to the GOA areas.

According to the liquid crystal display panel provided in an embodiment of the present disclosure, the hollow structure further includes a third hollow structure corresponding to the array routing area.

An embodiment of the present disclosure provides a display device including the liquid crystal display panel in above.

Beneficial effects of the present disclosure are: in a liquid crystal display panel and a display device provided in the present disclosure, a hollow structure is defined in a common electrode layer disposed on a color filter substrate, the hollow structure includes a first hollow structure corresponding to a display area, and an area of the first hollow structure progressively increases along a direction from an array routing area to the display area, so that an area of the common electrode layer corresponding to the display area progressively decreases along the direction from the array routing area to the display area. Therefore, RC loadings of the display area from areas adjacent to the array routing area to areas away from the array routing area remain uniform, and charging rates in various areas of the display area remain same, thereby improving display quality of the liquid crystal display panel.

BRIEF DESCRIPTION OF THE SEVERAL VIEWS OF THE DRAWINGS

In order to explain embodiments or technical solutions in prior art more clearly, following will briefly introduce drawings used in description of the embodiments or the prior art. Obviously, the drawings in the following description are merely some implementations of the present disclosure, for those of ordinary skill in the art, other drawings can be obtained based on these drawings without creative work.

DESCRIPTION OF SPECIFIC EMBODIMENTS OF THE INVENTION

Figure 1:
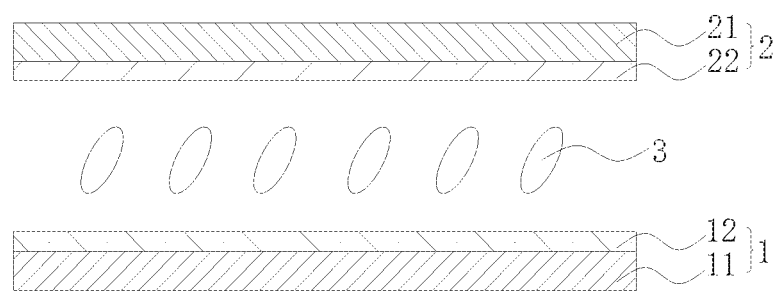
FIG. 1 is a schematic view of a cross-sectional structure of a liquid crystal display panel provided in an embodiment of the present disclosure.

Following description of each embodiment refers to additional illustrations to illustrate specific embodiments of the present disclosure that can be implemented. Orientational terms mentioned in the present disclosure, such as "upper", "lower", "front", "rear", "left", "right", "inner", "outer", "side", etc., merely refer to directions referring to the attached drawings. Therefore, the orientational terms are used to illustrate and understand the present disclosure, not to limit the present disclosure. In the figures, units with similar structures are indicated by same reference numerals.

In the description of the present disclosure, it should be understood that orientational or positional relationships indicated by terms, such as "center", "longitudinal", "transverse", "length", "width", "thickness", "upper", "lower", "front", "rear", "left", "right", "vertical", "horizontal", "top", "bottom", "inside", "outside", "clockwise", "counter-clockwise", etc., are based on the orientational or positional relationships shown in the drawings, and are merely for convenience of describing the present disclosure and simplifying the description, and does not indicate or imply that the device or element referred to must have a specific orientation, be constructed and operate in a specific orientation, and therefore cannot be understood as a limitation on the present disclosure. In addition, terms "first" and "second" are used herein for purposes of description, and should not be interpreted as indication or implication of relative importance or implicitly indicating a number of technical features indicated. Thus, the features defined as "first" and "second" may explicitly or implicitly include one or more of the features. In the description of the present disclosure, the meaning of "plurality" is two or more, unless specifically defined otherwise.

In description of the present disclosure, it should be noted, terms "install", "connect", and "couple" shall be understood broadly, unless otherwise explicitly stated and defined, and may be, for example, a fixed connection, a detachable connection, or an integral connection; a mechanical connection or an electrical connection; directly connected or indirectly connected through an intermediate medium; an internal connection of the two elements. The specific meanings of the above terms in the present disclosure can be understood in the specific circumstances for those skilled in the art.

In the present disclosure, unless specifically stated and defined otherwise, that a first feature is "on" or "under" a second feature may include: the first feature and the second feature are in direct contact, alternatively, the first feature and the second feature are not in direct contact but are contacted by another feature between them. Furthermore, that the first feature is "on", "above", or "upon" the second feature includes that the first feature is directly above and obliquely above the second feature, or merely indicates that the first feature is higher in level than the second feature. That the first feature is "under" or "below" the second feature includes that the first feature is directly below and obliquely below the second feature, or merely indicates that the first feature is lower in level than the second feature.

Following disclosure provides various different implementations or examples for implementing different structures of the present disclosure. To simplify the disclosure of the present disclosure, components and settings of specific examples are described below. Of course, they are merely examples and are not intended to limit the present disclosure. In addition, the present disclosure may repeat reference numbers and/or reference letters in different examples, and such repetition is for purpose of simplicity and clarity, and does not indicate relationship between the various embodiments and/or settings discussed. In addition, examples of various specific processes and materials are provided in the present disclosure, but those of ordinary skill in the art may be aware of application of other processes and/or other materials.

The present disclosure is aimed at liquid crystal display panels and display devices in prior art. Because ununiform RC loadings in different areas of a display area cause different charging rates in the different areas, display quality is affected. The embodiments can relieve this defect.

Figure 2:
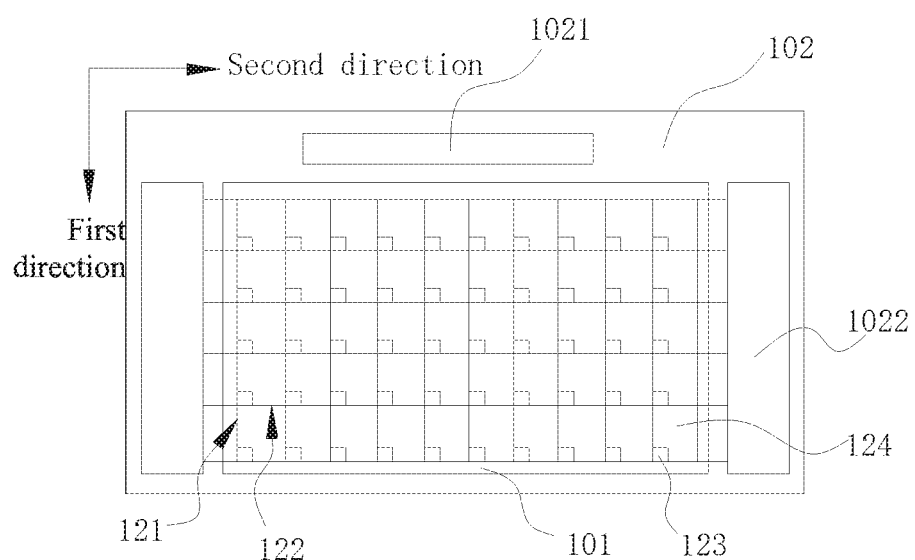
FIG. 2 is a schematic view of a plane structure of an array substrate provided in an embodiment of the present disclosure.

As shown in FIG. 1 and FIG. 2, the liquid crystal display panel provided in an embodiment of the present disclosure includes an array substrate 1, a color filter substrate 2 disposed opposite to the array substrate 1, and a liquid crystal layer 3 sandwiched between the array substrate 1 and the color filter substrate 2.

The array substrate 1 includes a first base substrate 11 and a thin film transistor (TFT) array layer 12 disposed on a side of the first base substrate 11 adjacent to the color filter substrate 2. The TFT array layer 12 includes a pixel electrode layer 124. The array substrate 1 includes a display area 101 and a non-display area 102 surrounding the display area 101. The non-display area 102 includes an array routing area 1021 disposed at a side of the display area 101, and the array routing area 1021 is configured to arrange metal wirings from an integrated circuit chip to the display area 101 and other routing areas.

The color filter substrate 2 includes a second base substrate 21 and a common electrode layer 22 disposed on a side of the second base substrate 21 adjacent to the array substrate 1. A voltage difference is formed between the common electrode layer 22 and the pixel electrode layer 124 to drive liquid crystals in the liquid crystal layer 3 to rotate, thereby displaying images.

As shown in FIG. 3, FIG. 4, FIG. 5, and FIG. 6, a hollow structure 4 is defined in the common electrode layer 22. The hollow structure 4 includes a first hollow structure 41 corresponding to the display area 101. An area of the first hollow structure 41 progressively increases along a first direction, so that an area of the common electrode layer 22 corresponding to the display area 101 progressively decreases along the first direction. It should be noted that the first direction refers to a direction from the array routing area 1021 to the display area 101. Because a value of a capacitance is proportional to a value of an area where the capacitance is formed, an arrangement of the first hollow structure 41 decreases an area of the display area 101 where the capacitance is formed, that is, a capacitance of the liquid crystal display panel is decreased, thereby decreasing RC loadings in an area where the first hollow structure 41 is defined. It can be understood, that because the area of the first hollow structure 41 progressively increases along the first direction, a decreasing range of the RC loadings in an area of the display area 101 adjacent to the array routing area 1021 is less than a decreasing range of the RC loadings in an area of the display area 101 away from the array routing area 1021, thereby balancing the RC loadings in various areas of the display area 101, relieving defect of ununiform charging rates in the liquid crystal display panel, and improving display quality.

The display area 101 includes a plurality of pixel units, the pixel units include opening areas and non-opening areas. The pixel electrode layer 124 is located in the opening areas. In order not to affect normal display of the liquid crystal display panel, the first hollow structure 41 should be disposed to avoid the opening area and be opposite to the non-opening areas of the pixel units.

Specifically, the display area 101 includes a plurality of columns of data lines 121 arranged in parallel along the first direction and a plurality of rows of scan lines 122 arranged in parallel along a second direction. The data lines 121 cross the scan lines 122. The data lines 121 and the scan lines 122 surround to define the pixel units, and thin film transistors 123 are disposed at cross positions of the data lines 121 and the scan lines 122. Wherein, the first hollow structure 41 is disposed opposite to at least part of the data lines 121, the scan lines 122, and the thin film transistors 123.

It should be noted that the second direction is perpendicular to the first direction. More specifically, the first direction is parallel to an extension direction of the data lines 121, and the second direction is parallel to an extension direction of the scan lines 122.

Figure 3:
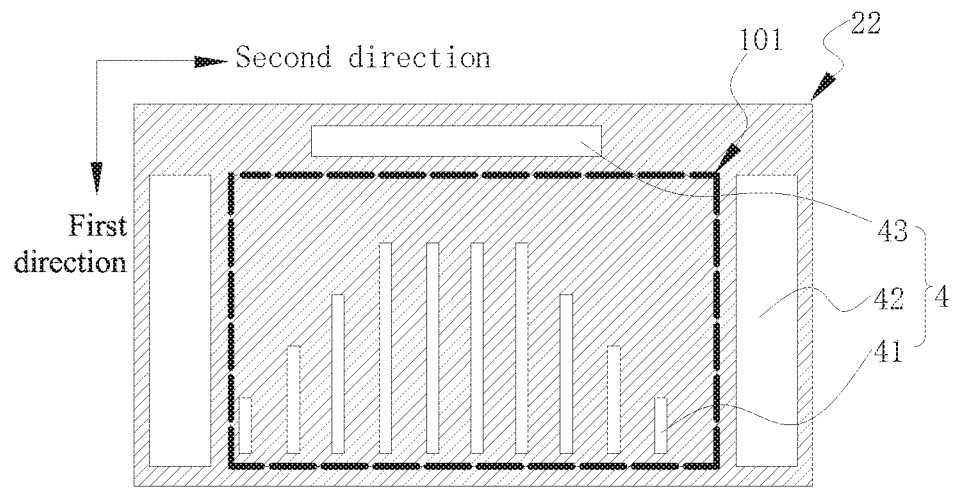
FIG. 3 is a schematic view of a plane structure of a first common electrode layer provided in an embodiment of the present disclosure.

As shown in FIG. 3, in an embodiment, the first hollow structure 41 is disposed opposite to at least one of the data lines 121, and an area of the first hollow structure 41 in the second direction progressively increases along the first direction. The first hollow structure 41 may be disposed opposite to each of the data lines 121 or several of the data lines 121 at even intervals. Specific sizes of the first hollow structure 41 corresponding to the data lines 121 should depend on specific actual conditions which include different sizes of the liquid crystal display panel and different process parameters, etc., so that the area of the first hollow structure 41 in the second direction progressively increases along the first direction, an area of the common electrode layer 22 in the second direction progressively decreases along the first direction, and the capacitance of the display area 101 progressively decreases along a direction from the area of the display area 101 adjacent to the array routing area 1021 to the area of the display area 101 away from the array routing area 1021, thereby balancing the RC loadings in various areas of the display area 101.

Generally, a width of the first hollow structure is greater than a width of each of the data lines 121, thereby further decreasing the capacitance between the common electrode layer 22 and the data lines 121.

Figure 4:
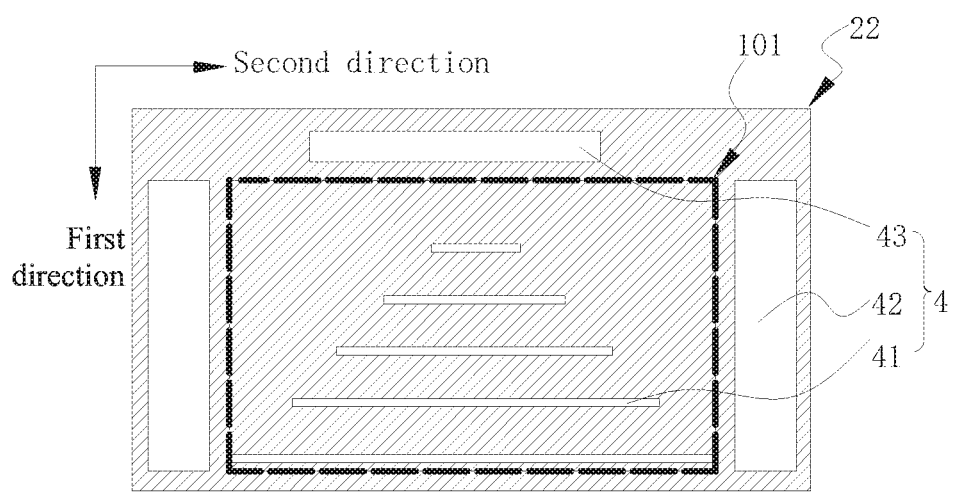
FIG. 4 is a schematic view of a plane structure of a second common electrode layer provided in an embodiment of the present disclosure.

As shown in FIG. 4, in an embodiment, the first hollow structure 41 is disposed opposite to at least one of the scan lines 122, and the area of the first hollow structure 41 in the second direction progressively increases along the first direction. Similarly, the first hollow structure 41 may be disposed opposite to each of the scan lines 122 or several of the scan lines 122 at even intervals. Specific sizes of the first hollow structure 41 corresponding to the scan lines 122 should depend on specific actual conditions which include different sizes of the liquid crystal display panel and different process parameters, etc., so that the area of the first hollow structure 41 in the second direction progressively increases along the first direction, the area of the common electrode layer 22 in the second direction progressively decreases along the first direction, and the capacitance of the display area 101 progressively decreases along a direction from the area of the display area 101 adjacent to the array routing area 1021 to the area of the display area 101 away from the array routing area 1021, thereby balancing the RC loadings in various areas of the display area 101.

Generally, a width of the first hollow structure is greater than a width of each of the scan lines 122, thereby further decreasing the capacitance between the common electrode layer 22 and the data lines 121.

Figure 5:
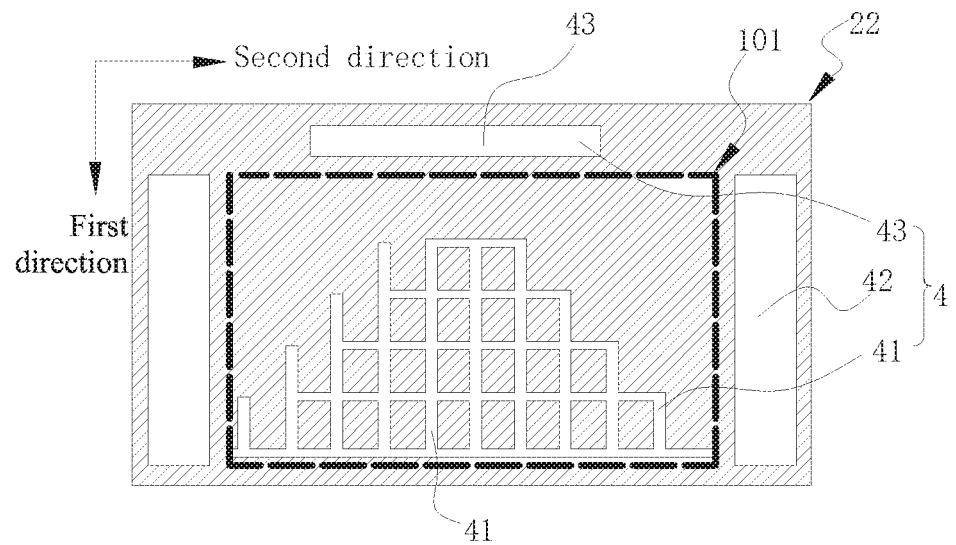
FIG. 5 is a schematic view of a plane structure of a third common electrode layer provided in an embodiment of the present disclosure.

As shown in FIG. 5, in an embodiment, the two embodiments shown in FIG. 3 and FIG. 4 may be combined. Specifically, the first hollow structure 41 is disposed opposite to at least one of the data lines 121 and at least one of the scan lines 122, and the area of the first hollow structure 41 in the second direction progressively increases along the first direction. The first hollow structure 41 has a mesh shape, and such an embodiment can further decrease the capacitance.

Furthermore, an orthographic projection of the first hollow structure 41 on the array substrate 1 covers orthographic projections of at least a part of the thin film transistors 123 on the array substrate 1. Wherein, the at least part of the thin film transistors 123 are the thin film transistors 123 at the cross positions of the data lines 121 and the scan lines 122 opposite to the first hollow structure 41. Compared with the embodiment in which the first hollow structure 41 is disposed merely opposite to the data lines 121 and the embodiment in which the first hollow structure 41 is disposed merely opposite to the scan lines 122, in this embodiment, the capacitance can be further decreased.

Figure 6:
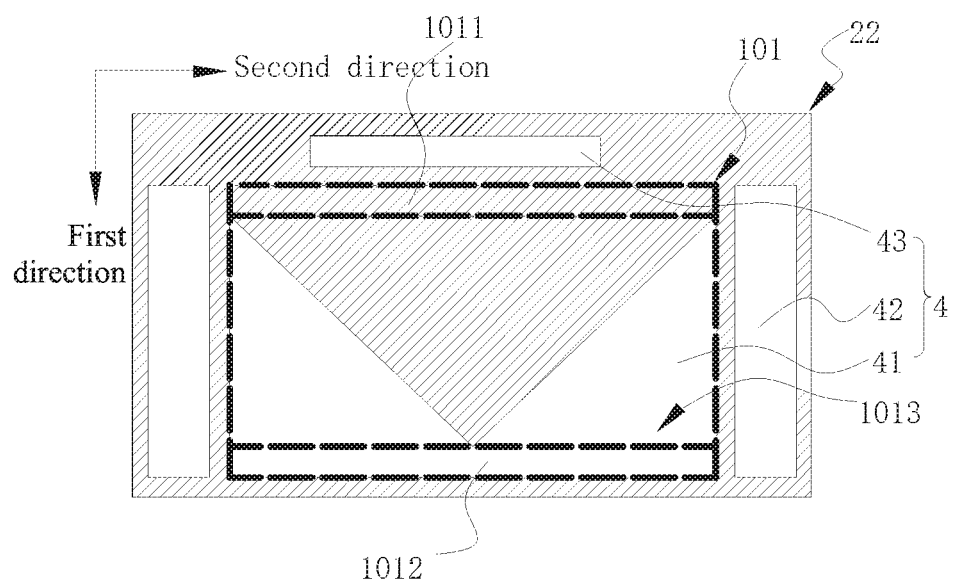
FIG. 6 is a schematic view of a plane structure of a fourth common electrode layer provided in an embodiment of the present disclosure.

As shown in FIG. 6, in actual process, because the RC loadings in the area of the display area 101 adjacent to the array routing area 1021 and the RC loadings in the area of the display area 101 away from the array routing area 1021 have largest difference, the common electrode layer 22 corresponding to the display area 101 is generally provided as follows: the first hollow structure 41 is not arranged in a part area adjacent to the array routing area 1021, the first hollow structure 41 is completely disposed in a part area away from the array routing area 1021, and the first hollow structure 41 is provided with its area increasing in the first direction in an area between the part area adjacent to the array routing area 1021 and the part area away from the array routing area 1021.

Specifically, the display area 101 includes a first area 1011 disposed adjacent to the array routing area 1021, a second area 1012 disposed away from the array routing area 1021, and a third area 1013 disposed between the first area 1011 and the second area 1012. Wherein, the first hollow structure 41 is defined in the common electrode layer 22 corresponding to the second area 1012 and a part of the third area 1013, and the first hollow structure 41 is not defined in the common electrode layer 22 corresponding to the first area 1011. Areas of the first area 1011, the second area 1012, and the third area 1013 should be set according to actual conditions, and area ranges of the first area 1011, the second area 1012, and the third area 1013 can be adjusted according to the RC loadings of each area obtained by simulation, and then according to charging rates obtained by simulation. Multiple adjustments and simulations are required to obtain optimal areas.

It should be noted that a shape corresponding to the first hollow structure 41 in the third area 1013 is merely to illustrate a technical solution of this embodiment, and is not limited thereto.

Furthermore, the non-display area 102 further includes gate on array (GOA) areas 1022 disposed at opposite sides of the display area 101. The GOA areas 1022 are disposed at an adjacent side of the array routing area 1021. The hollow structure 41 includes a second hollow structure 42 corresponding to the GOA areas 1022, the second hollow structure 42 can decrease a capacitance between the common electrode layer 22 and driving wirings in the GOA areas 1022, thereby helping to reduce power consumption.

Furthermore, the hollow structure 4 further includes a third hollow structure 43 corresponding to the array routing area 1021. The third hollow structure 43 can decrease a capacitance between the common electrode layer 22 and the metal wirings in the array routing area 1021, thereby helping to reduce power consumption.

Specifically, the hollow structure 4 may be manufactured by lasering

It should be noted that, dotted areas in FIG. 3, FIG. 4, FIG. 5, and FIG. 6 are areas of the display area 101 where the common electrode layer 22 corresponds to the array substrate 1. A shape of the first hollow structure 41 is not limited in the embodiments of the present disclosure, as long as balancing effect of the RC loadings in various areas of the display area 101 can be achieved, the requirements can be satisfied.

An embodiment of the present disclosure further provides a display device including the liquid crystal display panel as mentioned above. The display device may specifically be a display device with a display function such as a mobile phone, a computer, an on-board display device, etc.

Beneficial effects are: in the liquid crystal display panel and the display device provided in embodiments of the present disclosure, a hollow structure is defined in a common electrode layer disposed on a color filter substrate, the hollow structure includes a first hollow structure corresponding to a display area, and an area of the first hollow structure progressively increases along a direction from an array routing area to the display area, so that an area of the common electrode layer corresponding to the display area progressively decreases along the direction from the array routing area to the display area. Therefore, RC loadings in the display area from areas adjacent to the array routing area to areas away from the array routing area remain uniform, and charging rates in various areas of the display area remain same, thereby improving display quality of the liquid crystal display panel.

In summary, although the present disclosure has been disclosed as above with preferred embodiments, the above preferred embodiments are not intended to limit the present disclosure. For those of ordinary skill in the art, various changes and modifications can be made without departing from spirit and scope of the present disclosure, so protection scope of the present disclosure is subject to the scope defined by the claims.

What is claimed is:

1. A liquid crystal display panel, comprising:
an array substrate comprising a pixel electrode layer, and comprising:
   a display area; and
   a non-display area surrounding the display area and comprising an array routing area disposed at a side of the display area;
a color filter substrate disposed opposite to the array substrate and comprising a common electrode layer; and
a liquid crystal layer sandwiched between the array substrate and the color filter substrate,
wherein a hollow structure is defined in the common electrode layer, the hollow structure is manufactured by lasering, the hollow structure comprises a first hollow structure corresponding to the display area, an area of the first hollow structure progressively increases along a first direction, so that an area of the common electrode layer corresponding to the display area progressively decreases along the first direction, and the first direction refers to a direction from the array routing area to the display area.

2. The liquid crystal display panel in claim 1, wherein the display area comprises a plurality of columns of data lines arranged in parallel along the first direction and a plurality of rows of scan lines arranged in parallel along a second direction, the data lines cross the scan lines, and thin film transistors are disposed at cross positions of the data lines and the scan lines, the first hollow structure is disposed opposite to at least part of the data lines, the scan lines, and the thin film transistors; and wherein the second direction is perpendicular to the first direction.

3. The liquid crystal display panel in claim 2, wherein the first hollow structure is disposed opposite to at least one of the data lines, and the area of the first hollow structure in the second direction progressively increases along the first direction.

4. The liquid crystal display panel in claim 3, wherein a width of the first hollow structure is greater than a width of each of the data lines.

5. The liquid crystal display panel in claim 2, wherein the first hollow structure is disposed opposite to at least one of the scan lines, and the area of the first hollow structure in the second direction progressively increases along the first direction.

6. The liquid crystal display panel in claim 2, wherein the first hollow structure is disposed opposite to at least one of the data lines and at least one of the scan lines, and the area of the first hollow structure in the second direction progressively increases along the first direction.

7. The liquid crystal display panel in claim 6, wherein an orthographic projection of the first hollow structure on the array substrate covers orthographic projections of at least a part of the thin film transistors on the array substrate.

8. The liquid crystal display panel in claim 1, wherein the display area comprises a first area, a second area, and a third area, the first area is disposed adjacent to the array routing area, the second area is disposed away from the array routing area, and the third area is disposed between the first area and the second area, wherein, the first hollow structure is defined in the common electrode layer corresponding to the second area and a part of the third area, and the first hollow structure is not defined in the common electrode layer corresponding to the first area.

9. The liquid crystal display panel in claim 1, wherein the non-display area comprises gate on array (GOA) areas disposed at opposite sides of the display area, the GOA areas are disposed at an adjacent side of the array routing area, and the hollow structure comprises a second hollow structure corresponding to the GOA areas.

10. The liquid crystal display panel in claim 1, wherein the hollow structure further comprises a third hollow structure corresponding to the array routing area.

11. A liquid crystal display panel, comprising:
an array substrate comprising a pixel electrode layer, and comprising:
   a display area; and
   a non-display area surrounding the display area and comprising an array routing area disposed at a side of the display area;
a color filter substrate disposed opposite to the array substrate and comprising a common electrode layer; and
a liquid crystal layer sandwiched between the array substrate and the color filter substrate,
wherein a hollow structure is defined in the common electrode layer, the hollow structure comprises a first hollow structure corresponding to the display area, an area of the first hollow structure progressively increases along a first direction, so that an area of the common electrode layer corresponding to the display area progressively decreases along the first direction, and the first direction refers to a direction from the array routing area to the display area.

12. The liquid crystal display panel in claim 11, wherein the display area comprises a plurality of columns of data lines arranged in parallel along the first direction and a plurality of rows of scan lines arranged in parallel along a second direction, the data lines cross the scan lines, and thin film transistors are disposed at cross positions of the data lines and the scan lines, the first hollow structure is disposed opposite to at least part of the data lines, the scan lines, and the thin film transistors; and wherein the second direction is perpendicular to the first direction.

13. The liquid crystal display panel in claim 12, wherein the first hollow structure is disposed opposite to at least one of the data lines, and the area of the first hollow structure in the second direction progressively increases along the first direction.

14. The liquid crystal display panel in claim 12, wherein a width of the first hollow structure is greater than a width of each of the data lines.

15. The liquid crystal display panel in claim 12, wherein the first hollow structure is disposed opposite to at least one of the scan lines, and the area of the first hollow structure in the second direction progressively increases along the first direction.

16. The liquid crystal display panel in claim 15, wherein an orthographic projection of the first hollow structure on the array substrate covers orthographic projections of at least a part of the thin film transistors on the array substrate.

17. The liquid crystal display panel in claim 11, wherein the display area comprises a first area, a second area, and a third area, the first area is disposed adjacent to the array routing area, the second area is disposed away from the array routing area, and the third area is disposed between the first area and the second area, wherein, the first hollow structure is defined in the common electrode layer corresponding to the second area and a part of the third area, and the first hollow structure is not defined in the common electrode layer corresponding to the first area.

18. The liquid crystal display panel in claim 11, wherein the non-display area comprises gate on array (GOA) areas disposed at opposite sides of the display area, the GOA areas are disposed at an adjacent side of the array routing area, and the hollow structure comprises a second hollow structure corresponding to the GOA areas.

19. The liquid crystal display panel in claim 11, wherein the hollow structure further comprises a third hollow structure corresponding to the array routing area.

20. A display device, comprising a liquid crystal display panel comprising:

an array substrate comprising a pixel electrode layer, and comprising:
  a display area; and
  a non-display area surrounding the display area and comprising an array routing area disposed at a side of the display area;
a color filter substrate disposed opposite to the array substrate and comprising a common electrode layer; and
a liquid crystal layer sandwiched between the array substrate and the color filter substrate,
wherein a hollow structure is defined in the common electrode layer, the hollow structure comprises a first hollow structure corresponding to the display area, an area of the first hollow structure progressively increases along a first direction, so that an area of the common electrode layer corresponding to the display area progressively decreases along the first direction, and the first direction refers to a direction from the array routing area to the display area.

* * * * *